(12) United States Patent
Shinozaki

(10) Patent No.: US 8,396,978 B2
(45) Date of Patent: Mar. 12, 2013

(54) PROXY RESPONSE APPARATUS, PROXY RESPONSE METHOD IN PROXY RESPONSE APPARATUS, AND COMMUNICATION SYSTEM

(75) Inventor: Atsushi Shinozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 102 days.

(21) Appl. No.: 13/165,268

(22) Filed: Jun. 21, 2011

(65) Prior Publication Data

US 2011/0252149 A1  Oct. 13, 2011

Related U.S. Application Data

(63) Continuation of application No. PCT/JP2009/000040, filed on Jan. 8, 2009.

(51) Int. Cl.
*G06F 15/16* (2006.01)

(52) U.S. Cl. ........ 709/230; 709/203; 709/212; 709/216; 709/217; 709/227; 709/246; 709/248

(58) Field of Classification Search .................. 709/203, 709/212, 216, 217, 227, 230, 246, 248
See application file for complete search history.

(56) References Cited

U.S. PATENT DOCUMENTS

| | | | |
|---|---|---|---|
| 7,647,385 B2 * | 1/2010 | Encarnacion et al. ........ | 709/217 |
| 8,244,179 B2 * | 8/2012 | Dua ............................ | 455/41.2 |
| 2005/0044430 A1 | 2/2005 | Cheshire | |
| 2006/0002320 A1 | 1/2006 | Costa-Requena et al. | |
| 2007/0078959 A1 | 4/2007 | Ye | |
| 2011/0078231 A1 * | 3/2011 | Oliver et al. ................. | 709/203 |

FOREIGN PATENT DOCUMENTS

| | | |
|---|---|---|
| JP | 2006-260425 | 9/2006 |
| JP | 2008-092129 | 4/2008 |
| JP | 2008-312020 | 12/2008 |
| WO | 2007/000658 | 1/2007 |
| WO | 2007/010454 | 1/2007 |

OTHER PUBLICATIONS

Notification of Reason for Rejection issued for corresponding Japanese Patent Application No. 2010-545624 dispatched on Aug. 7, 2012 with partial English translation.
The extended European search report issued for corresponding European Patent Application No. 09837424.2 dated Jul. 12, 2012.
International Search Report issued for corresponding International Patent Application No. PCT/JP2009/000040, mailed Apr. 14, 2009.
IEEE Std. 802.16e-2005 and IEEE Std. 802.16-2004/Cor1-2005; "Part 16: Air Interface for Fixed and Mobile Broadband Wireless Access Systems; Amendment 2: Physical and Medium Access Control Layers for Combined Fixed and Mobile Operation in Licensed Bands and Corrigendum 1"; IEEE Computer Society and the IEEE Microwave Theory and Techniques Society; IEEE, 3 Park Avenue, New York, NY 10016-5997, USA; Feb. 28, 2006.

(Continued)

*Primary Examiner* — Michael Won
(74) *Attorney, Agent, or Firm* — Myers Wolin, LLC

(57) ABSTRACT

A proxy response apparatus, including: a storage unit which establishes connection with a mobile terminal by TCP and stores message information included in a packet obtained from the mobile terminal; a response processing unit which receives a packet from an external apparatus, and responds whether message information included in the receive packet is effective or not to the message information stored in the storage unit; and a TCP processing unit which transmits a packet including a response message to the external apparatus without establishing radio connection with the mobile terminal, when the TCP processing unit inputs the response indicating effective from the response processing unit.

9 Claims, 13 Drawing Sheets

COMMUNICATION SYSTEM 1

OTHER PUBLICATIONS

Alan Presser, AllegroSoft et al; "UPnP Device Architecture 1.1", Document Revision date Oct. 15, 2008, Contributing Members of the UPnP Forum; [URL: http://www.upnp.org/info/cpyright.asp].

Notification of Reason for Rejction issued for corresponding Japanese Patent Application No. 2010-545624, dispatched Nov. 13, 2012, with partial English translation.

* cited by examiner

COMMUNICATION SYSTEM 1

FIG. 11A
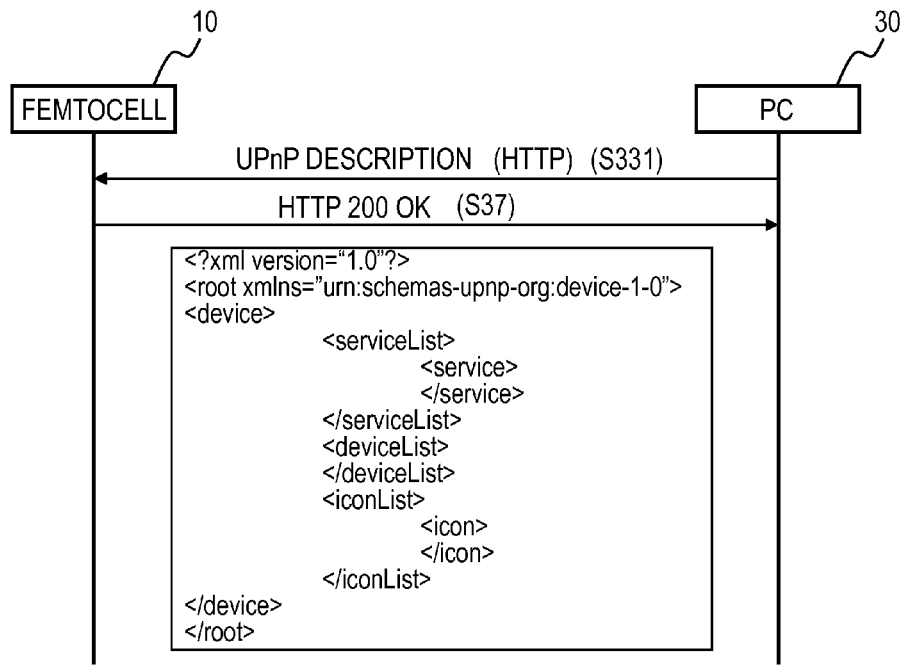
FIG. 11B
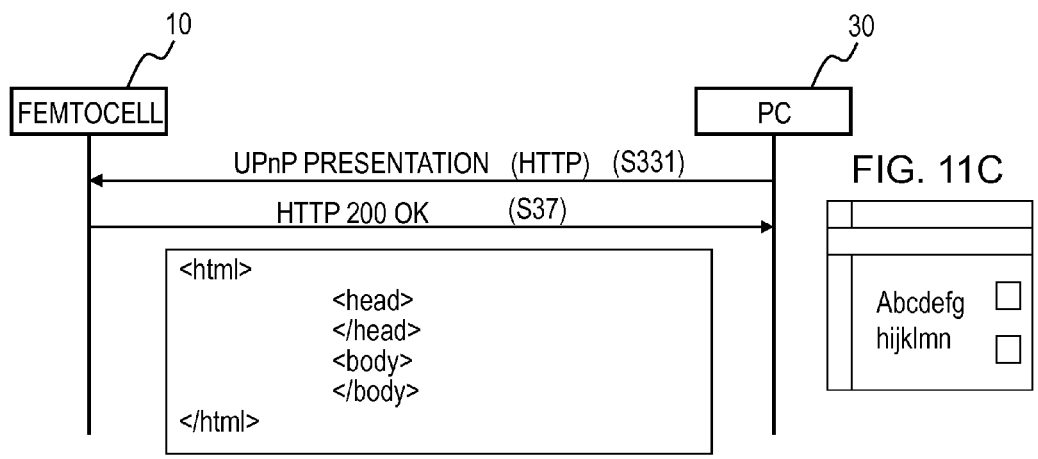
FIG. 11C

FIG. 12

| TYPE | LENGTH | FUNCTION | REFERENCE |
|---|---|---|---|
| 0 | - | End of Option List | RFC793 |
| 1 | - | No-Operation | RFC793 |
| 2 | 4 | Maximum Segment Size | RFC793 |
| 3 | 3 | WSOPT - Window Scale | RFC1323 |
| 4 | 2 | SACK Permitted | RFC2018 |
| 5 | N | SACK | RFC2018 |
| 6 | 6 | Echo (obsoleted by option 8) | RFC1072 |
| 7 | 6 | Echo Reply (obsoleted option 8) | RFC1072 |
| 8 | 10 | TSOPT – Time Stamp Option | RFC1323 |
| 9 | 2 | Partial Order Connection Permitted | RFC1693 |
| 10 | 3 | Partial Order Service Profile | RFC1693 |
| 11 |  | CC | RFC1644 |
| 12 |  | CC.NEW | RFC1644 |
| 13 |  | CC.ECHO | RFC1644 |
| 14 | 3 | TCP Alternate Checksum Request | RFC1146 |
| 15 | N | TCP Alternate Checksum Data | RFC1146 |
| 16 |  | Skeeter | Knowles |
| 17 |  | Bubba | Knowles |
| 18 | 3 | Trailer Checksum Option | Subbu & Monroe |
| 19 | 18 | MD5 Signature Option | RFC2385 |
| 20 |  | SCPS Capabilities | Scott |
| 21 |  | Selective Negative Acknowledgment | Scott |
| 22 |  | Record Bondaries | Scott |
| 23 |  | Corruption experienced | Scott |
| 24 |  | SNAP | Sukonnik |
| 25 |  | Unassigned (released 12/18/00) |  |
| 26 |  | TCP Compression Filter | Bellovin |
| 27 | 8 | Quick-Start Response | RFC4782 |
| 28-252 |  | Unassigned |  |
| 253 | N | RFC3692-style Experiment 1 | RFC4782 |
| 254 | N | RFC3692-style Experiment 2 | RFC4782 |

PROXY RESPONSE APPARATUS, PROXY RESPONSE METHOD IN PROXY RESPONSE APPARATUS, AND COMMUNICATION SYSTEM

CROSS-REFERENCE TO RELATED APPLICATIONS

This application is a continuation of International Application No. PCT/JP2009/000040, filed on Jan. 8, 2009, now pending, the contents of which are herein wholly incorporated by reference.

TECHNICAL FIELD

The embodiments discussed herein are related to a proxy response apparatus, a proxy response method in a proxy response apparatus, and a communication system.

BACKGROUND ART

A protocol named UPnP (Universal Plug and Play) has been available (e.g. see Non-patent Literature 1 below). For example, by using UPnP, an apparatus connected to a network can detect other apparatuses on the network, collect information on the apparatuses, and control the apparatuses.

On the other hand, a radio communication system, such as 3GPP (3rd Generation Partnership Project) and WiMAX, effectively uses a radio resource by allowing a mobile terminal to transit to a power save mode or wait mode (e.g. see Non-patent Literature 2 below).

If a mobile terminal is connected to a UPnP network, a base station and the mobile terminal mutually perform a processing specified by UPnP. Examples of the processing are a processing for detecting an apparatus (e.g. "Notify", "M-SEARCH") and a processing for obtaining information (e.g. "Presentation").

However it is not effective for the base station to allow the mobile terminal to transit from a power save mode to a communicable mode using a radio resource.

Therefore a conventionally disclosed proxy processing apparatus has: a receive unit which receives a packet to be transmitted to a network; a processing decision unit which refers to information stored in a storage unit for the received packet, and determines a processing to be performed as a proxy of a radio LAN terminal specified by the information stored in the storage unit; and a processing execution unit which executes processing determined by the processing decision unit (e.g. see Patent Literature 1 below).

Non-patent Document 1: UPnP Device Architecture 1.1, 15 Oct. 2008
Non-patent Document 2: IEEE 802.16e-2005
Patent Document 1: Japanese Laid-open Patent Publication No. 2008-92129

DISCLOSURE OF THE INVENTION

Problems to be Solved by the Invention

In order to perform processing of "Presentation", "Description" or the like, however, a proxy processing apparatus executes a handshake procedure with a mobile terminal for establishing a TCP (Transmission Control Protocol) connection. After this, the proxy processing apparatus transmits and receives such messages as "UPnP Presentation" and "UPnP Description".

Therefore if such a processing as "Presentation" is executed, the proxy processing apparatus allows the mobile terminal in the power save mode to transit to a communicable mode, for example, and uses a radio resource with the mobile terminal. Hence in such a case, the radio resource cannot be effectively used with the mobile terminal. The power consumption of the mobile terminal also increases since the mobile terminal transits from the power save mode to the communicable mode.

Accordingly, it is an object in one aspect of the invention to provide a proxy response apparatus which effectively uses the radio resource, a proxy response method for the proxy response apparatus, and a communication system.

It is another object in one aspect of the invention to provide a proxy response apparatus which reduces power consumption of a mobile terminal.

Means for Solving the Problem

According to an aspect of the invention, a proxy response apparatus, including: a storage unit which establishes connection with a mobile terminal by TCP and stores message information included in a packet obtained from the mobile terminal; a response processing unit which receives a packet from an external apparatus, and responds whether message information included in the receive packet is effective or not to the message information stored in the storage unit; and a TCP processing unit which transmits a packet including a response message to the external apparatus without establishing radio connection with the mobile terminal, when the TCP processing unit inputs the response indicating effective from the response processing unit.

Also, according to an another aspect of the invention, a proxy response method in a proxy response apparatus, the method including: establishing connection with a mobile terminal by TCP, and storing to a storage unit of the proxy response apparatus message information included in a packet obtained from the mobile terminal; receiving a packet from an external apparatus, and responding whether a message information included in the receive packet is effective or not to the message information stored in the storage unit; and transmitting a packet including a response message to the external apparatus without establishing radio communication with the mobile terminal, when inputting the response indicating effective.

Furthermore, according to an another aspect of the invention, a communication system, including: an external apparatus; a proxy response apparatus; and a mobile terminal, wherein the external apparatus establishes connection with the proxy response apparatus by TCP and transmits a packet to the proxy response apparatus, the mobile terminal establishes connection with the proxy response apparatus by the TCP and transmits a packet to the proxy response apparatus, and the proxy response apparatus includes: a storage unit which establishes connection with the mobile terminal by the TCP and stores message information included in the packet obtained from the mobile terminal; a response processing unit which receives the packet from the external apparatus, and responds whether message information included in the receive packet is effective or not to the message information stored in the storage unit; and a TCP processing unit which transmits a packet including a response message to the external apparatus without establishing radio connection with the mobile terminal, when the TCP processing unit inputs the response indicating effective from the response unit.

Advantageous Effect of the Invention

The present invention can provide a proxy response apparatus which effectively uses the radio resource, a proxy response method for the proxy response apparatus, and a communication system. A proxy response apparatus which reduces power consumption of a mobile terminal can be provided.

BRIEF DESCRIPTION OF THE DRAWINGS

FIG. 11A and FIG. 11B illustrate an example of data included in "UPnP Description" and "UPnP Presentation";
FIG. 12 is an example of data inserted in an "Option" area of a TCP header.

EXPLANATION OF REFERENCE NUMERALS

1 COMMUNICATION SYSTEM
10 FEMTO CELL
11 RADIO COMMUNICATION PROCESSING UNIT
12 MOBILE TERMINAL STATE MANAGEMENT UNIT
13 IP PROCESSING UNIT
14 TRANSMITTING AND RECEIVING UNIT
15 TCP PROCESSING UNIT
16 PACKET ANALYZING UNIT
17 UPnP PROXY PROCESSING UNIT
171 STORAGE UNIT
172 RESPONSE PROCESSING UNIT
20 BB ROUTER
30 PC
40 MOBILE TERMINAL

BEST MODE FOR CARRYING OUT THE INVENTION

Best mode for carrying out the present invention will now be described.

First Embodiment

Figure 1:
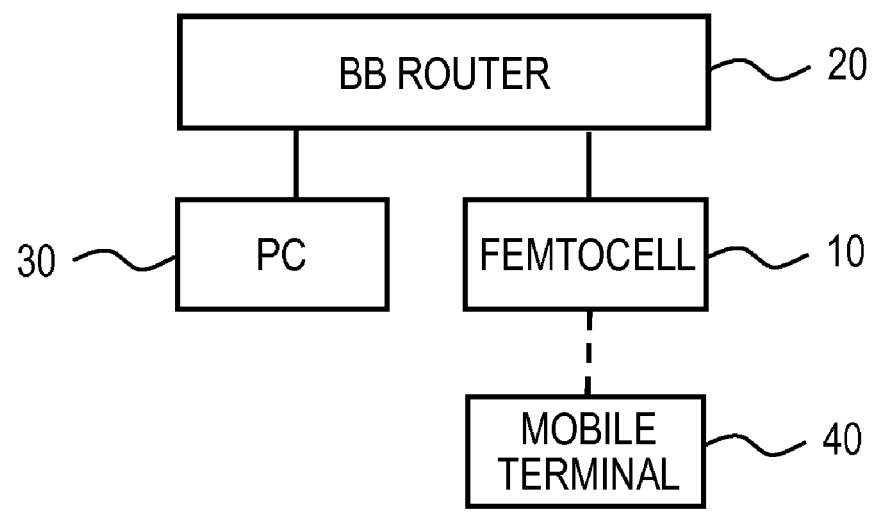
FIG. 1 illustrates a configuration example of a communication system.

FIG. 1 illustrates a configuration example of a communication system 1. The communication system 1 includes a femto cell 10, a broadband router (hereafter BB router) 20, a personal computer (hereafter PC) 30, and a mobile terminal 40.

The femto cell 10 is a radio base station apparatus which is installed indoors, for example, and is a proxy response apparatus according to the First Embodiment. The femto cell 10 transmits and receives a message in UPnP protocol. Details will be described later.

The BB router 20 is connected with the femto cell 10, and provides access to the Internet via a broadband line. The BB router 20 is installed in a home, for example.

The PC 30 is a personal computer and is connected with the BB router 20 to transmit and receive a message in UPnP protocol. The PC 30 can be any external apparatus which can transmit and receive this message, and an AV apparatus installed in a home, such as a TV, may be used instead of a personal computer.

The mobile terminal 40, which is located in a communicable range of the femto cell 10, can perform radio communication with the femto cell 10. The mobile terminal 40 can access the PC 30 and the Internet via the femto cell 10. The mobile terminal 40 can transmit and receive messages related to the UPnP.

Figure 2:
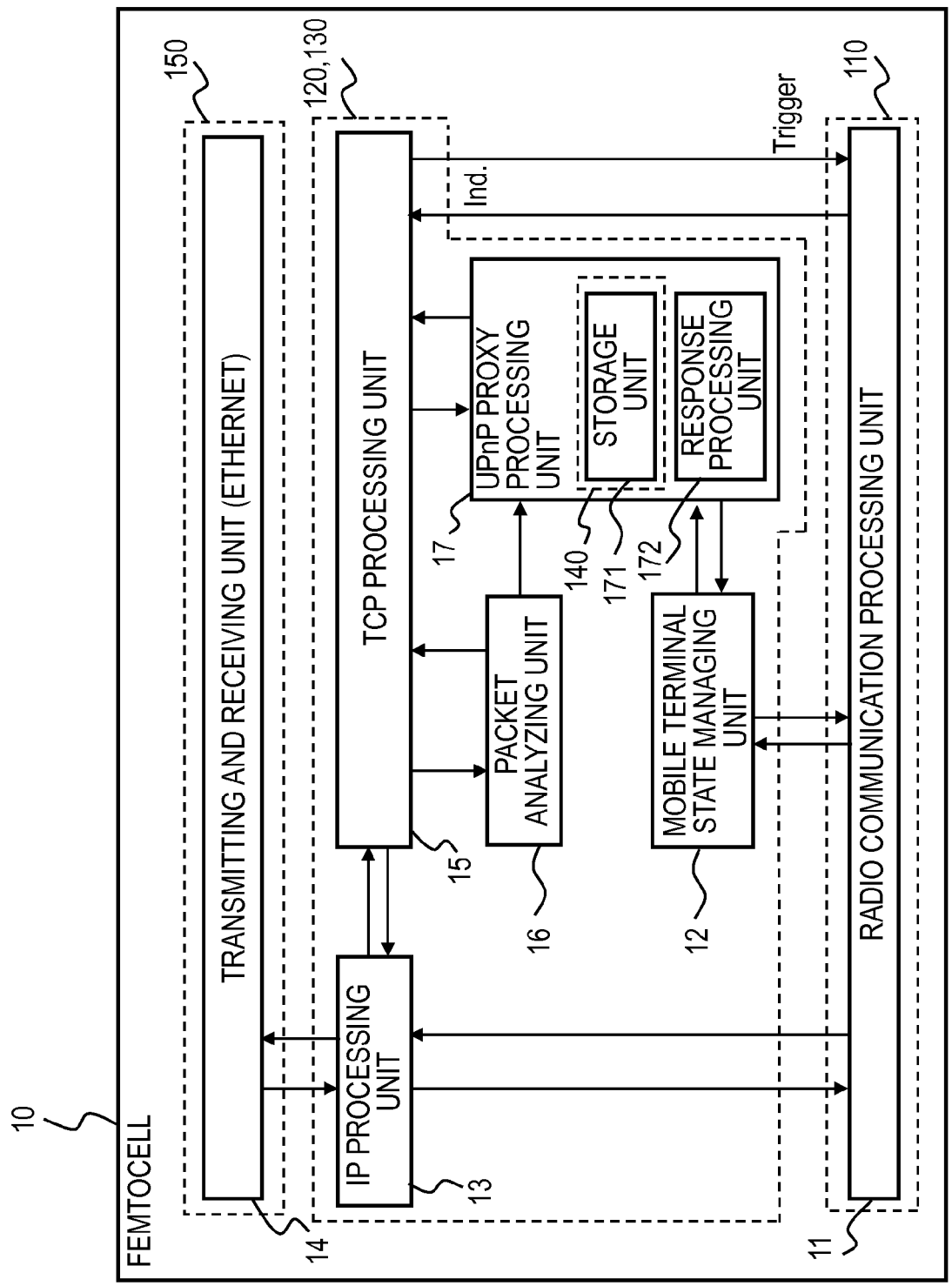
FIG. 2 illustrates a configuration example of a femto cell.

FIG. 2 illustrates a configuration example of the femto cell 10. The femto cell 10 includes a radio communication processing unit 11, a mobile terminal state managing unit 12, an IP (Internet Protocol) processing unit 13, a transmitting and receiving unit 14, a TCP processing unit 15, a packet analyzing unit 16 and a UPnP proxy processing unit 17.

The radio communication processing unit 11 performs various signal processing and performs radio communication with the mobile terminal 40. If a request signal to establish communication with the mobile terminal 40 is input from the TCP processing unit 15, the radio communication processing unit 11 inquires the state of the mobile terminal 40 to the mobile terminal state managing unit 12. If communication with the mobile terminal 40 has already been established, the radio communication processing unit 11 outputs this information to the TCP processing unit 15. If the communication is not established, the radio communication processing unit 11 establishes the communication with the mobile terminal 40, and outputs this information to the TCP processing unit 15.

The mobile terminal state managing unit 12 manages whether communication with the mobile terminal 40 is established or not, and other terminal states. If an inquiry on the state of the mobile terminal 40 is received from the radio communication processing unit 11, the mobile terminal state managing unit 12 notifies the state to the radio communication processing unit 11. The mobile terminal state managing unit 12 notifies the state of the mobile terminal 40 if an inquiry is received from the UPnP proxy processing unit 17.

The IP processing unit 13 converts the data from the radio communication processing unit 11 into an IP packet, and outputs the packet to the transmitting and receiving unit 14, or extracts data from a packet received from the transmitting and receiving unit 14, and outputs the data to the radio communication processing unit 11. The IP processing unit 13 determines which mobile terminal under the femto cell 10 that a packet, received from the transmitting and receiving unit 14, is addressed, and also determines whether the packet is a TCP packet. If the received packet is addressed to the mobile terminal 40 and is a TCP packet, the IP processing unit 13 outputs the packet to the TCP processing unit 15. The IP processing unit 13 refers to a header of the packet, for example, to determine whether the packet is addressed to the mobile terminal 40 and whether the packet is a TCP packet. If the UPnP message is a connectionless type message, such as a UDP (User Datagram Protocol), which does not require a handshake procedure with the mobile terminal 40, the IP processing unit 13 outputs this message to the radio communication processing unit 11. If the UPnP message is a connection type message which requires a handshake procedure to established the TCP connection with the mobile terminal 40 (e.g. TCP packet), for example, the IP processing unit 13 outputs this packet to the TCP processing unit 15.

The transmitting and receiving unit 14 receives a packet transmitted from the PC 30 via the BB router 20, and outputs the packet to the IP processing unit 13, or transmits a packet which is output from the IP processing unit 13 to the BB router 20.

If a TCP packet from the IP processing unit 13 includes a "TCP-SYN" message, which is a control message, the TCP processing unit 15 generates a "TCP-SYN-ACK" message, and transmits a TCP packet including this message to the PC 30.

Figure 3:
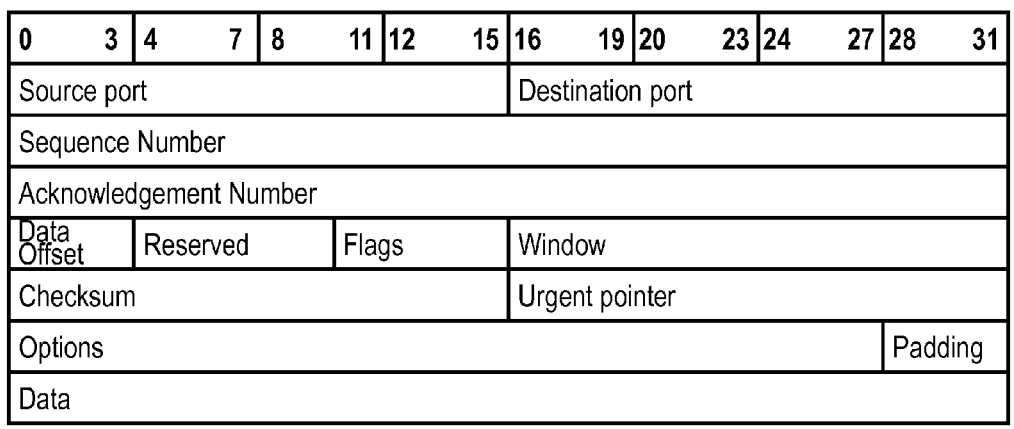
FIG. 3 illustrates an example of a TCP header.

FIG. 3 illustrates an example of a TCP header. The header of the TCP packet has a field to indicate whether a "TCP-SYN" message is included ("Flags"). For example, using this field, the TCP processing unit 15 can determine whether a "TCP-SYN" message is included. Then the TCP processing unit 15 establishes a TCP connection with the PC 30 by receiving a TCP packet including a "TCP-ACK" message from the PC 30.

The TCP processing unit 15 also outputs a TCP packet other than "TCP-SYN" from the IP processing unit 13 to the packet analyzing unit 16. Further, the TCP processing unit 15 outputs a request signal to establish communication with the mobile terminal 40 to the radio communication processing unit 11 based on the output from the UPnP proxy processing unit 17. If communication is established with the mobile terminal 40, the TCP processing unit 15 establishes a TCP connection, and transmits a TCP packet from the PC 30 to the mobile terminal 40 via the IP processing unit 13 and the radio communication processing unit 11.

The packet analyzing unit 16 determines whether a TCP packet is a packet including a UPnP message, and whether a message of "Description" or "Presentation" is included if this is a case of including a UPnP message. For example, the packet analyzing unit 16 determines whether this message is included or not by analyzing the payload of the TCP packet. If the TCP packet includes this message, the packet analyzing unit 16 outputs the TCP packet to the UPnP proxy processing unit 17, and if not, the packet analyzing unit 16 outputs the TCP packet to the TCP processing unit 15.

The UPnP proxy processing unit 17 has a storage unit 171 and a response processing unit 172.

The storage unit 171 stores the UPnP information included in the payload, time stamp information and effective period information among other, out of the TCP packet received from the packet analyzing unit 16. An example of the information stored in the storage unit 171 will be described later.

The response processing unit 172 determines whether a corresponding UPnP information of the message of "Description" or "Presentation" of the TCP packet is stored in the storage unit 171, and whether the stored UPnP information is within an effective period if it is stored. The response processing unit 172 outputs the determination result and the TCP packet to the TCP processing unit 15.

Now one example of hardware configuration of the femto cell 10 is explained. The femto cell 10 includes a radio communication IF (interface) 110, processor 120, logic circuit 130, memory 140, and wired communication IF (interface) 150. The radio communication IF 110 is an interface device to perform radio communication with the mobile terminal 40, for example. The processor 120 is a device to process data, and includes, for example, CPU (central Processing Unit), DSP (Digital Signal Processor), or another devices. The logic circuit 130 is an electronic circuit to perform logic operation, and includes, for example, LSI (Large Scale Integration), FPGA (Field-Programming Gate Array), or another devices. The memory 140 is a device to storage data, and includes, for example, ROM (Read Only Memory), RAM (Random Access Memory), or another devices. The wired communication IF 150 is an interface device to perform wired communication with the BB router 20.

In addition, the correspondence of the femto cell 100 illustrated in FIG. 2 to the hardware is as follows, for example. The radio communication IF 110 corresponds to the radio communication processing unit 11, for example. The processor 120 and logic circuit 130 correspond to the mobile terminal state managing unit 12, IP processing unit 13, TCP processing unit 15, packet analyzing unit 16, and response processing unit 172, for example. The memory 140 corresponds to the storage unit 171. The wired communication IF 150 corresponds to the transmitting and receiving unit 14.

Now an example of the operation of the femto cell 10 will be described. As a preparation, the femto cell 10 obtains UPnP information from the mobile terminal 40, and stores the UPnP information in the storage unit 171. If a TCP packet including a message of "Presentation" or "Description" is received thereafter from the PC 30, the femto cell 10 terminates and analyzes this packet, and transmits a response as a prosy of the mobile terminal 40 if response is possible.

Figure 4:
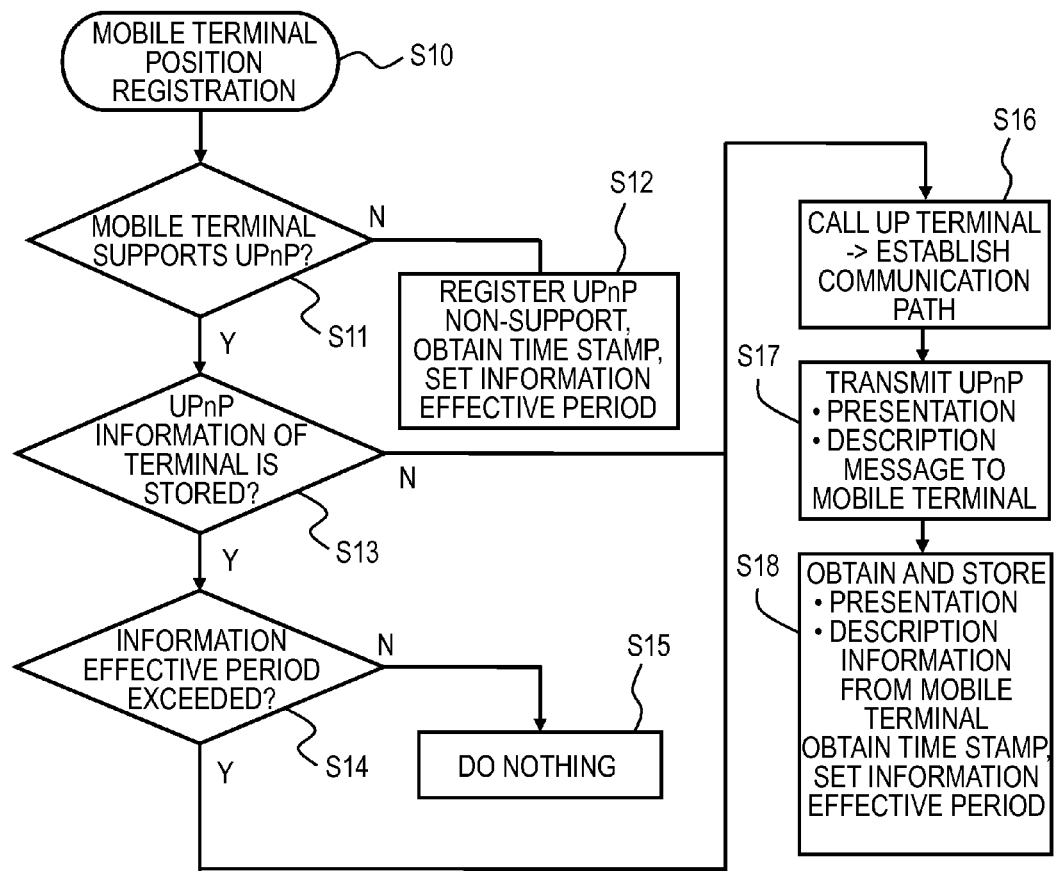
FIG. 4 is a flow chart illustrating an example of a preparation processing.
Figure 5:
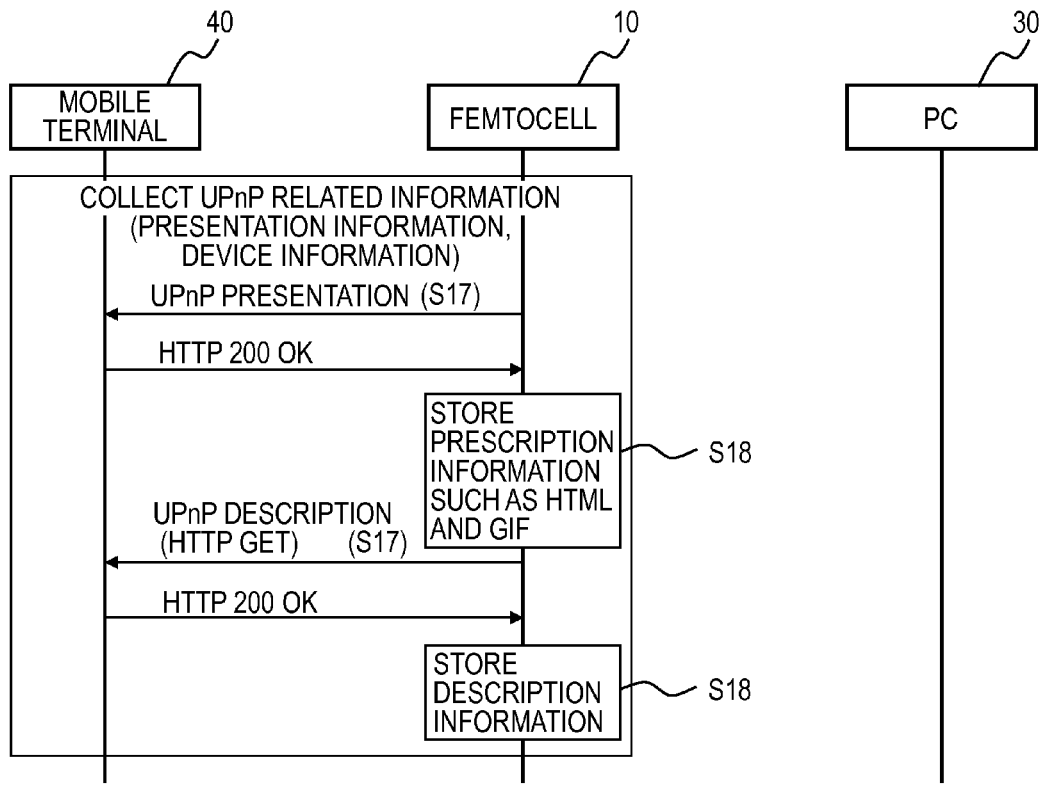
FIG. 5 is a sequence diagram illustrating an example of the preparation processing.

FIG. 4 is a flow chart illustrating an example of the preparation operation performed in the femto cell 10, and FIG. 5 is a sequence diagram illustrating the example.

First the femto cell 10 performs processing to register the mobile terminal 40 (S10). For example, the mobile terminal state managing unit 12 performs registration processing by storing identification information and the like for each mobile station 40.

If the mobile terminal 40 is located in the femto cell 10 after the registration processing, the femto cell 10 determines whether the mobile terminal 40 is a mobile terminal supporting the UPnP protocol (S11). For example, the response processing unit 172 of the UPnP proxy processing unit 17 reads information obtained through the registration processing from the mobile terminal state managing unit 12, and determines whether the mobile terminal 40 is a mobile terminal supporting UPnP.

If it is determined that the mobile terminal 40 does not support UPnP (N in S11), the femto cell 10 stores information that this mobile terminal 40 does not support UPnP, and information on the time stamp information at this determination and an effective period of non-support (S12). For example, the response processing unit 172 stores information on UPnP non-support and other information in the storage unit 171.

Figure 6:
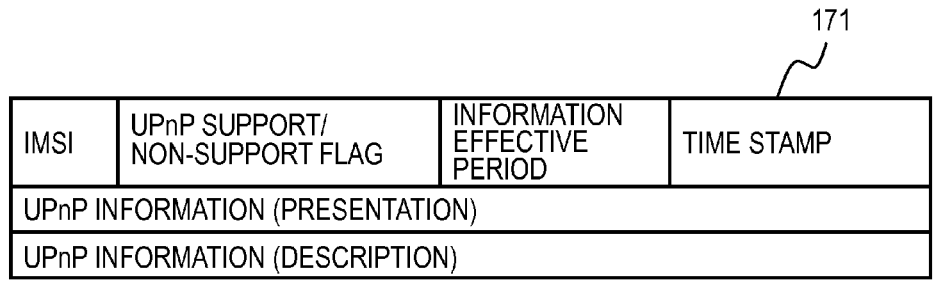
FIG. 6 is an example of information stored in a storage unit.

FIG. 6 illustrates an example of information stored in the storage unit 171. As illustrated in FIG. 6, such information as "UPnP support or non-support flag", "information effective period" and "time stamp" is stored in the storage unit 171. The information illustrated in FIG. 5 is held for each mobile terminal 40. For example, the identification information of the mobile terminal 40 is also stored in the storage unit 171.

If it is determined that the mobile terminal 40 is a terminal supporting UPnP (Y in S11), on the other hand, the femto cell 10 determines whether the UPnP information of the mobile terminal 40 is stored (S13). For example, the response processing unit 172 accesses the storage unit 171, and determines whether "UPnP information" for the mobile terminal 40 is stored.

If the UPnP information is held (Y in S13), the femto cell 10 determines whether the effective period of the UPnP information is exceeded (S14). For example, the response processing unit 172 determines whether the current time exceeds the effective period based on the "information effective period" of the storage unit 171.

If it is determined that the effective period is not exceeded (N in S14), the femto cell 10 ends the series of preparation without executing any special processing, since the UPnP information on the mobile terminal 40 held in the storage unit 171 is effective (S15).

If the effective period is exceeded, on the other hand (Y in S14), or if the UPnP information on the mobile terminal 40 is not stored (N in S13), the femto cell 10 establishes a communication path with the mobile terminal 40, so as to obtain the UPnP information from the mobile terminal 40 (S16). For example, the response processing unit 172 notifies the TCP processing unit 15 that the effective period is exceeded, or that the UPnP information is not stored, and the TCP processing unit 15 outputs a request signal for establishing a communication path to the radio communication processing unit 11. Then the radio communication processing unit 11 performs processing for establishing the path, and the TCP processing unit 15 performs processing for establishing the TCP connection.

Then the femto cell 10 transmits a TCP packet, including a message for obtaining the UPnP information from the mobile terminal 40, to the mobile terminal 40 (S17). For example, the TCP processing unit 15 generates the message and transmits the message to the mobile terminal 40 via the IP processing unit 13.

Then the femto cell 10 receives a response message ("HTTP 200 OK" in the case of the example in FIG. 5) from the mobile terminal 40, and obtains the UPnP information included in this message, and stores the UPnP information, time stamp information on the time when the UPnP information is obtained or stored, and an information effective period, in the storage unit 171 (S18). For example, the TCP processing unit 15 receives a TCP packet including the response message, and outputs the packet to the packet analyzing unit 16. The packet analyzing unit 16 outputs this packet to the UPnP proxy processing unit 17, and the response processing unit 172 extracts the UPnP information from this packet, and stores the extracted UPnP information in the storage unit 171.

By performing the above processing, the UPnP information on the mobile terminal 40, the time stamp and the effective period are stored in the storage unit 171, as illustrated in FIG. 6.

Figure 7:
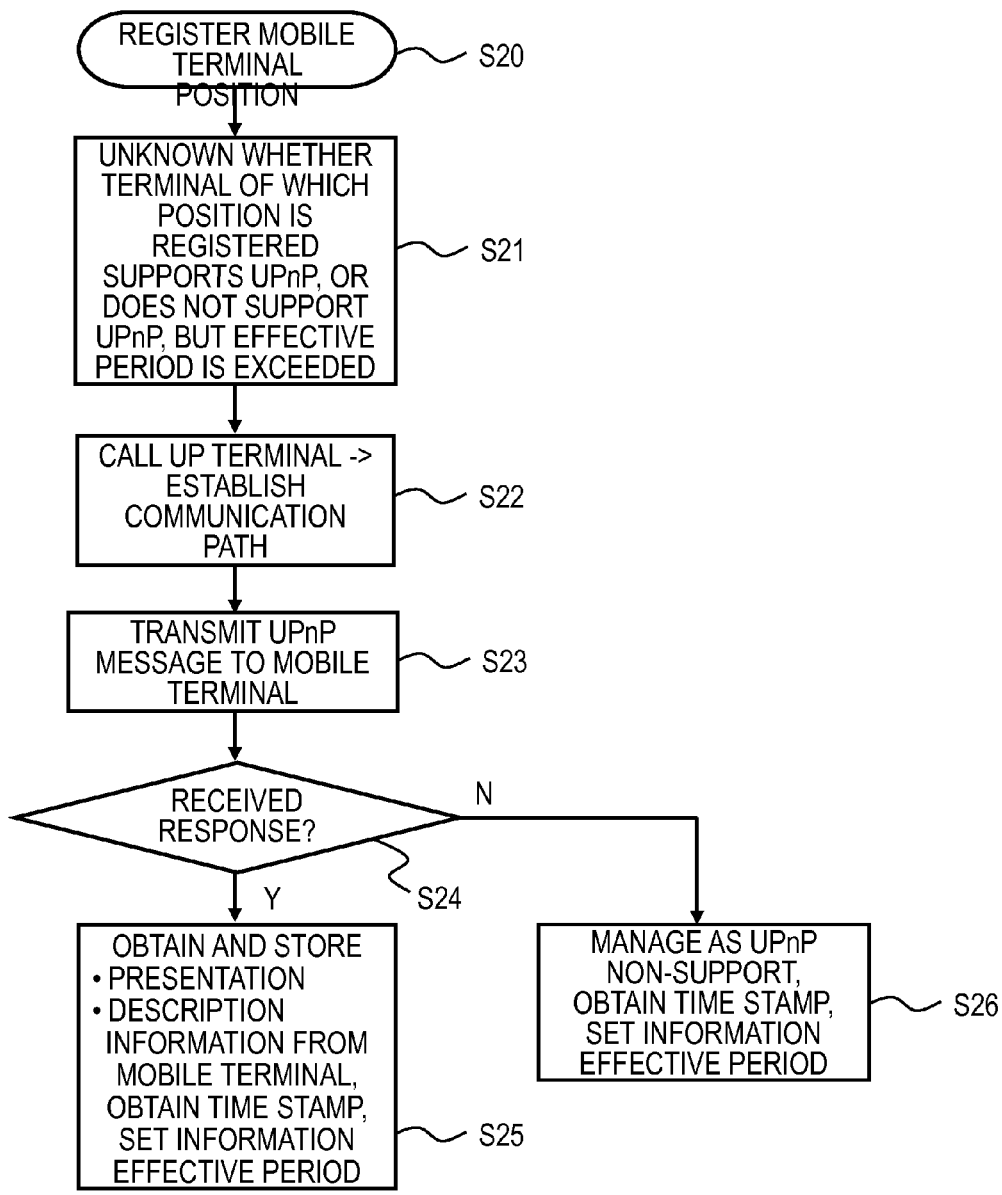
FIG. 7 is a flow chart illustrating another example of the preparation processing.

FIG. 7 is a flow chart illustrating another example of the preparation. The example in FIG. 7 is a case when it is unknown whether the mobile terminal 40 supports UPnP or not.

After the femto cell 10 performs processing to register the mobile terminal 40 (S20), if it is unknown whether the mobile terminal 40 supports UPnP or not, or if the mobile terminal 40 does not support UPnP and the effective period is exceeded (S21), the femto cell 10 establishes a communication path and a TCP connection with the mobile terminal 40 (S22).

Then the femto cell 10 transmits a TCP packet including a message exclusively assigned to the UPnP protocol to the mobile terminal 40 (S23). This is because whether the mobile terminal 40 supports UPnP or not can be determined depending on whether the mobile terminal 40 transmits a response message to reply a TCP packet including an exclusively assigned message. For example, the TCP processing unit 15 generates an exclusively assigned message, and transmits the message to the mobile terminal 40 via the IP processing unit 13.

Then the femto cell 10 determines whether a response message to the exclusively assigned message was received (S24). For example, the TCP processing unit 15 or the packet analyzing unit 16 determines whether the received TCP packet includes a response message or not.

If a response message is received (Y in S24), the femto cell 10 transmits a TCP packet, for obtaining UPnP information, to the mobile terminal 40, and receives a TCP packet including the UPnP information from the mobile terminal 40 (S25). For example, the TCP processing unit 15 receives a TCP packet including a response message, and outputs the TCP packet to the packet analyzing unit 16. The packet analyzing unit 16 outputs this packet to the UPnP proxy processing unit 17, the response processing unit 172 extracts the UPnP information from this packet, and stores the UPnP information, along with the time stamp information and the like, in the storage unit 171.

If a response packet to reply to the exclusively assigned message is not received (N in S24), on the other hand, the femto cell 10 stores the data on this mobile terminal 40 in the storage unit 171 as a mobile terminal not supporting UPnP, and the time stamp and the effective period are stored (S26). For example, the TCP processing unit 15 or the packet analyzing unit 16 notifies the response processing unit 172 that a response packet was not received, and the response processing unit 172 stores information that the mobile terminal 40 does not support UPnP in the storage unit 171.

Figure 8:
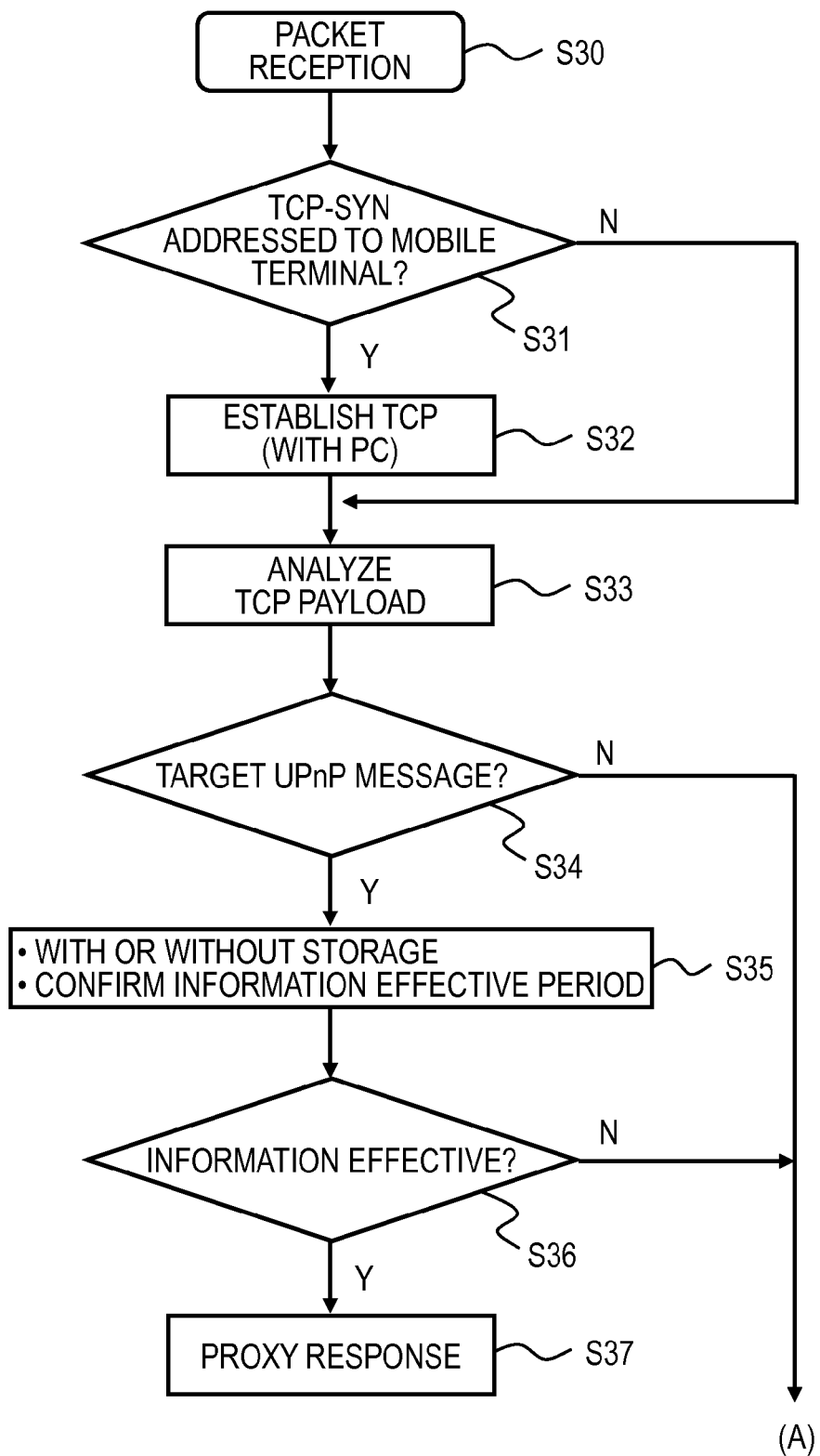
FIG. 8 is a flow chart illustrating an example of the proxy response processing.
Figure 9:
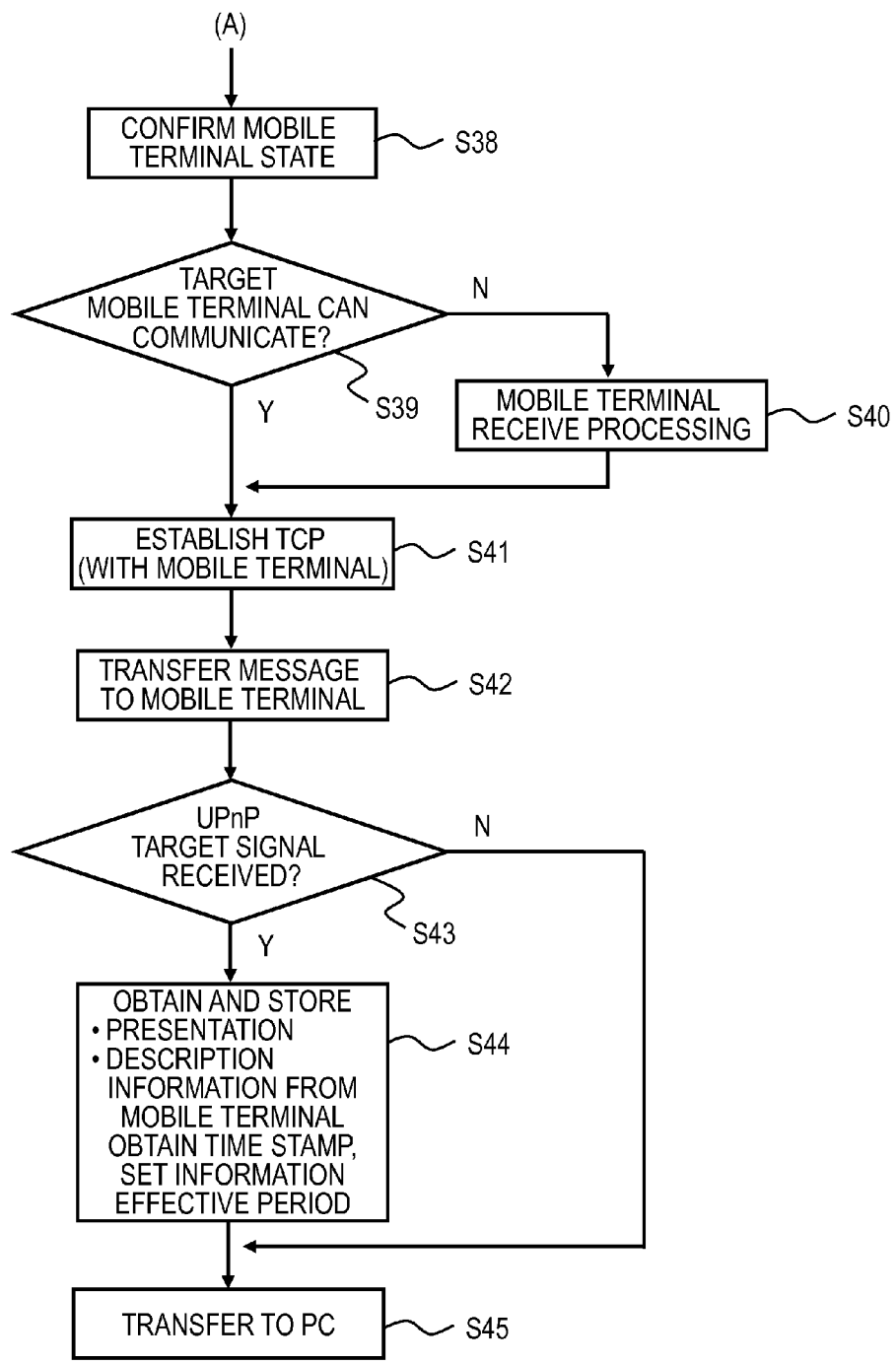
FIG. 9 is a flow chart illustrating an example of the proxy response processing.
Figure 10:
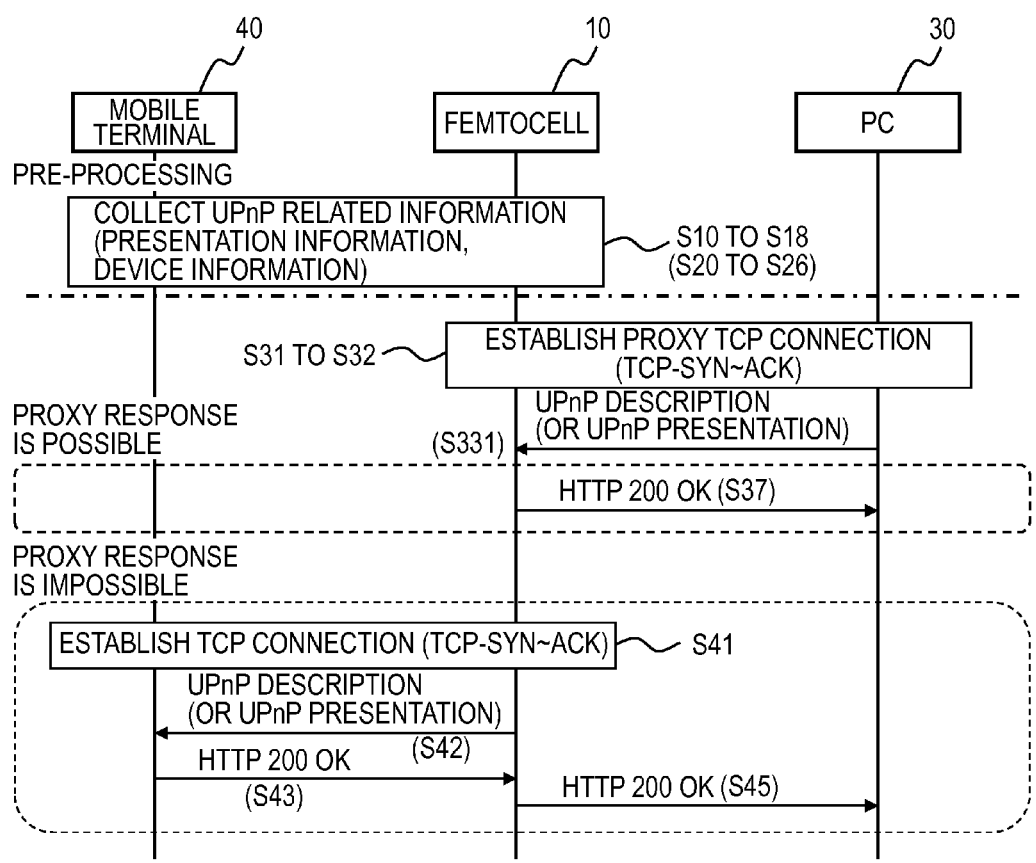
FIG. 10 is a sequence diagram illustrating an example of the proxy response processing.

Operation after the preparation will be described next. FIG. 8 and FIG. 9 are flow charts illustrating an example of this operation, and FIG. 10 is a sequence diagram illustrating this example.

The femto cell 10 receives a TCP packet from the PC 30 via the BB router 20 (S30).

Then the femto cell 10 determines whether the received TCP packet is a packet addressed to the mobile terminal 40 and whether a "TCP-SYN" message is included (S31). For example, the IP processing unit 13 determines whether the received packet is addressed to the mobile terminal 40 or not by the header of the packet, and the TCP processing unit 15 determines whether the TCP packet includes the "TCP-SYN" message by the "Flag" field of the header of the TCP packet.

If the received packet is addressed to the mobile terminal 40 and includes the "TCP-SYN" message (Y in S31), the femto cell 10 establishes a TCP connection with the PC 30 (S32). For example, the TCP processing unit 15 generates a "TCP-SYN-ACK" message for the "TCP-SYN" message, and sends this message to the PC 30. The TCP processing unit 15 establishes the TCP connection when a TCP packet including the "ACK" message is received from the PC 30 to reply to this "TCP-SYN-ACK" message.

After the TCP connection is established with the PC 30, the femto cell 10 receives a TCP packet including a message for obtaining UPnP information from the PC 30 (e.g. S331 in FIG. 10).

Then the femto cell 10 analyzes the payload of the received TCP packet (S33). For example, the TCP processing unit 15 outputs the received TCP packet to the packet analyzing unit 16, and the packet analyzing unit 16 analyzes the TCP packet.

If the TCP packet is addressed to the mobile terminal but does not include the "TCP-SYN" message, on the other hand (N in S31), the femto cell 10 still analyzes the payload of the TCP packet in the same manner (S33). This routine is a routine in the case of the femto cell 10 receiving a TCP packet from the PC 30 after the TCP connection is established.

Then the femto cell 10 determines whether the received TCP packet includes the "UPnP Description" message or "UPnP Presentation" message (S34). For example, the TCP processing unit 15 determines whether this message is included referring to the data included in the payload.

If the target UPnP message, such as the "UPnP Description" message, is included in the received TCP packet (Y in S34), the femto cell 10 checks whether UPnP information is stored, and (checks) the information effective period (S35). For example, the packet analyzing unit 16 outputs the TCP packet to the UPnP proxy processing unit 17, and the response processing unit 172 accesses the storage unit 171. The response processing unit 172 checks whether the UPnP information of the mobile terminal 40, which transmitted the target message, is stored in the storage unit 171, or whether whether the UPnP information included in the target message matches with the UPnP information stored in the storage unit 171, and then checks whether the current time is within the effective period.

If it is determined that the mobile target UPnP information of the terminal 40 is effective (Y in S36), the femto cell 10 generates a response message (e.g. "HTTP 200 OK") for the target message, and responds this message to the PC 30 as a proxy (S37). For example, the TCP processing unit 15, which received a notice that the UPnP information is effective from the response processing unit 172, generates a TCP packet including a response message, and transmits it to the PC 30. This response message includes the UPnP information.

In this way, even in the case of a message which cannot be responded to unless information is received from the mobile terminal 40, such as a "UPnP Description" message, or even in the case of a message which is transmitted after TCP establishes radio communication with the mobile terminal 40, the femto cell 10 can transmits a response message to reply to this message to the PC 30 without transmitting a "UPnP Description" message, for example. Since the femto cell 10 does not communicate with the mobile terminal 40, the radio resource between the femto cell 10 and the mobile terminal 40 can be effectively used for other processing. Furthermore, there is no need to transmit to the communicable mode when the mobile terminal 40 is in power save mode or wait mode, therefore the power consumption of the mobile terminal 40 can be reduced.

FIG. 11A and FIG. 11B illustrate examples of information included in a response message. The UPnP information on "Description" includes a apparatus configuration of the mobile terminal 40 and the content of services that can be provided, as illustrated in FIG. 11A. The UPnP information on "Presentation" includes information for displaying a specific user interface, as illustrated in FIG. 11B. In a apparatus which received the UPnP information on "Presentation", the information included in "Presentation" is displayed on a display unit, as illustrated in FIG. 11C.

If proxy response is impossible, that is, if a UPnP message is not included in the TCP packet (N in S34), or if the UPnP information on the mobile terminal 40 is not stored or if the effective period is exceeded even if such a message as "UPnP Description" is included (N in S36), the femto cell 10 establishes communication with the mobile terminal 40, and performs processing to transmit this message to the mobile terminal 40 (S38 to S45 in FIG. 9, S41 to S43 in FIG. 10).

In other words, the femto cell 10 checks the state of the mobile terminal (S38), and determines whether communication with the target mobile terminal 40 is possible (S39). For example, the TCP processing unit 15 outputs a request signal to establish communication to the radio communication processing unit 11, and the radio communication processing unit 11 inquires the communication state of the mobile terminal 40 to the mobile terminal state managing unit 12.

If communication with the mobile terminal 40 is not possible (N in S39), the femto cell 10 establishes a communication path with the mobile terminal 40 (S40). A communication impossible case is, for example, when the mobile terminal 40 is in the power save MODE or wait mode.

If the mobile terminal 40 is not located in a communicable range of the femto cell 10 (N in S39), the femto cell 10 transits this processing (S40). In this case, the femto cell 10 has not received a target UPnP message from the PC 30 (N in S34), so the femto cell 10 also performs processing to disconnect the TCP connection, which is established with the PC 30. For example, the TCP processing unit 15 performs the disconnection processing by generating a TCP packet including the "TCP FIN" message and transmitting the TCP packet to the PC 30.

When the mobile station 40 is in a communicable state (Y in S39), or after the processing in S40 is performed, the femto cell 10 performs processing to establish the TCP communication with the mobile terminal 40 (S41). For example, the radio communication processing unit 11 outputs a notice to inform the establishment of the communication path to the TCP processing unit 15, and the TCP processing unit 15 transmits and receives messages to establish the TCP connection with the mobile terminal 40 via the IP processing unit 13, for example, so as to establish the TCP connection.

Then the femto cell 10 transfers the TCP packet received from the PC 30 to the mobile terminal 40 (S42). The TCP processing unit 15 transmits the TCP packet to the mobile terminal 40 via the IP processing unit 13, for example.

Then the femto cell 10 determines whether a response message to the transmitted TCP packet is received (S43). For example, the TCP processing unit 15 or the packet analyzing unit 16 determines this. The response message is "HTTP 200 OK", for example.

If a response message is received (Y in S43), the femto cell 10 stores the UPnP information included in the response message, time stamp information and effective period information in the storage unit 171 (S44). For example, the TCP processing unit 15 outputs a TCP packet including the response message to the response processing unit 172 via the packet analyzing unit 16, and the response processing unit 172 stores the UPnP information in the storage unit 171.

Then the femto cell 10 transfers the response message received from the mobile terminal 40 to the PC 30 (S45). For example, the TCP processing unit 15 transfers the response message to the PC 30 via the IP processing unit 13.

If the UPnP target message is not received (N in S43), on the other hand, the femto cell 10 transfers the packet received from the mobile terminal 40 to the PC 30 (S45). For example, the TCP processing unit 15 transfers the packet received from the mobile terminal 40 to the PC 30 via the IP processing unit 13.

Second Embodiment

A second Embodiment will be described next. The Second Embodiment is a case of specifying information that a UPnP message of "UPnP Description" or "UPnP Presentation" is transmitted, in the header of a TCP packet including a "TCP-SYN" message. FIG. 12 is an example of data inserted into an "Option" field of the TCP packet (see FIG. 3). For example, any number that is not defined in a "28" to "252" range can be used.

Figure 13:
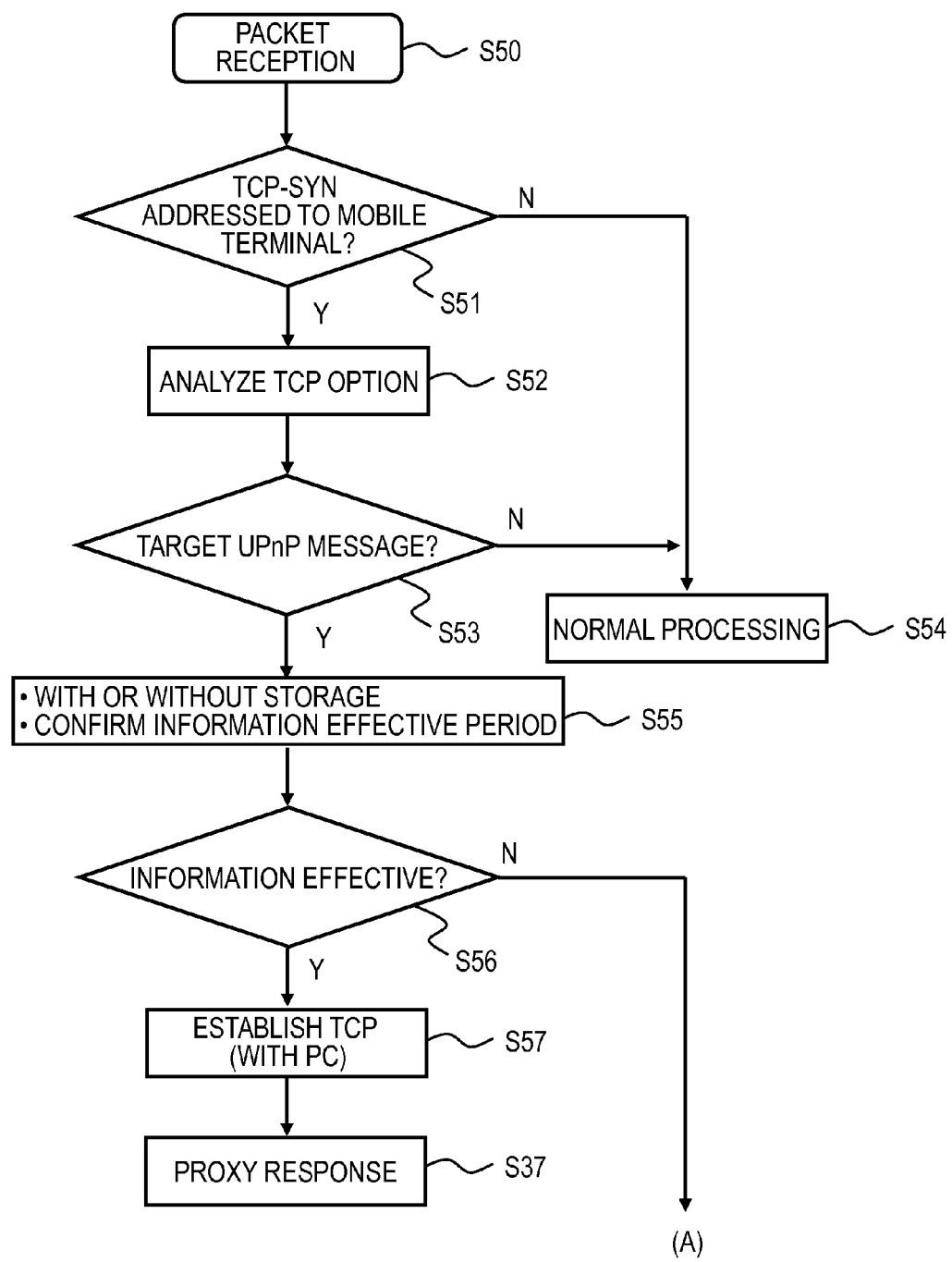
FIG. 13 is a flow chart illustrating another example of the proxy response processing.
Figure 14:
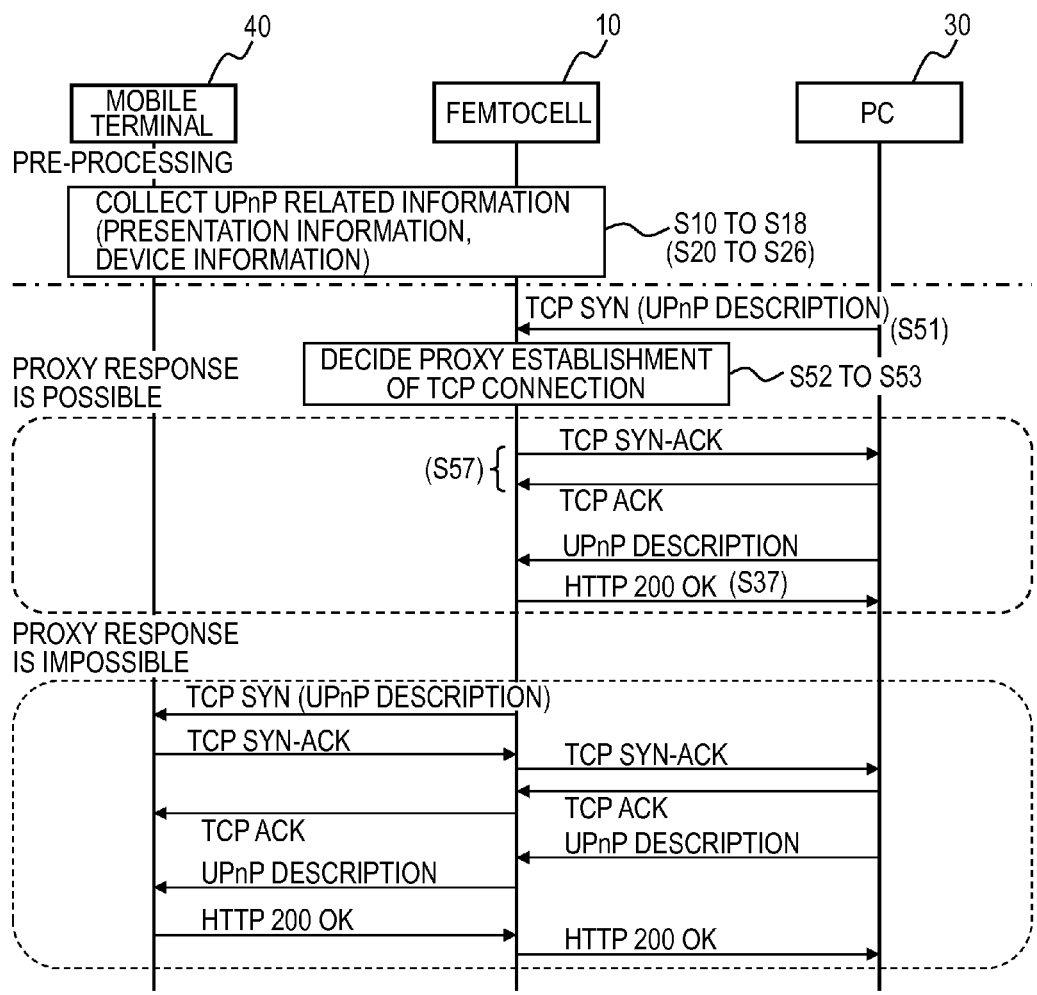
FIG. 14 is a sequence diagram illustrating another example of the proxy response processing.

FIG. 13 is a flow chart illustrating an example of the processing performed by the femto cell 10, and FIG. 14 is a sequence diagram illustrating this example. It is assumed that the preparation processing (FIG. 4 or FIG. 7) has been completed.

If a packet is received from the PC 30 (S50), the femto cell 10 determines whether this packet is a "TCP-SYN" packet addressed to the mobile terminal (S51). For example, the IP processing unit 13 determines whether the received packet addressed to the mobile terminal is a TCP packet or not, and the TCP processing unit 15 or the packet analyzing unit 16 determines whether the TCP packet includes a "TCP-SYN" message.

If the TCP packet includes the "TCP-SYN" message (Y in S51), the femto cell 10 analyzes "Option" which is inserted in the header of the received packet (S52). For example, the packet analyzing unit 16 analyzes the TCP packet.

Then the femto cell 10 determines whether the received packet includes a target UPnP message, that is, a "UPnP Description" message or "UPnP Presentation" message (S53). For example, the packet analyzing unit 16 determines wherein the target UPnP message is included based on a number inserted in the "Option" field of the TCP header.

If the received packet is the target UPnP message (Y in S53), the femto cell 10 checks whether the UPnP information of the mobile terminal 40 is stored, and checks the effective period of the information (S55). For example, the response processing unit 172 accesses the storage unit 171 and checks the information.

If the UPnP information is effective (Y in S56), the femto cell 10 determines whether to perform proxy establishment of the TCP connection, and establish the TCP connection with the PC 30 (S57). For example, if it is confirmed that the response processing unit 172 is effective, the femto cell 10 outputs this information to the TCP processing unit 15, and the TCP processing unit 15 establishes the TCP connection with the PC 30.

After establishing the TCP connection, the femto cell 10 receives a TCP packet including the target UPnP message from the PC 30, and returns a response to this message as a proxy to the PC 30 (S37). For example, if the TCP processing unit 15 receives a TCP packet including the target UPnP message, the TCP processing unit 15 generates a TCP packet including a response message (e.g. "HTTP 200 OK"), and transmits the TCP packet to the PC 30.

If the received packet is addressed to the mobile terminal and does not include the "TCP-SYN" message (N in S51), or if it is not a "TCP-SYN" packet to indicate that the target UPnP message is to be transmitted (N in S53), on the other hand, the femto cell 10 performs normal processing (S54).

If it is determined that the stored UPnP information is not effective (N in S56), the femto cell 10 performs processing for determining the UPnP information from the mobile terminal 40 (FIG. 14, S38 to S45 of FIG. 9).

In this case, the femto cell 10 transfers the "TCP-SYN" packet received from the PC 30 to the mobile terminal 40, and performs a series of TCP connection processing, and transmits the TCP packet including the target UPnP message to the mobile terminal 40 (see FIG. 14).

As described above, according to Example 2 as well, the femto cell 10 stores the UPnP information of the target mobile terminal 40 in advance, and if this information is effective, the femto cell 10 terminates the TCP packet without calling up the mobile terminal 40, and responds to the PC 30 as a proxy.

Therefore in the case of the femto call 10 responding as a proxy according to Example 2 as well, the radio resource between the femto cell 10 and the mobile terminal 40 can be used effectively, and power consumption of the mobile terminal 40 can also be reduced.

Other Embodiment

The above examples were described using the femto cell 10 as the proxy response apparatus. The present invention however can also be applied to a radio base station, such as a radio LAN access point, if the registering processing is performed for each mobile terminal 40, the proxy response can be performed storing UPnP information or the like. The BB router 20 or a host apparatus of the femto cell 10 may also be used as the proxy response apparatus only if proxy response can be performed by storing the UPnP information for each mobile terminal 40.

Figure 15:
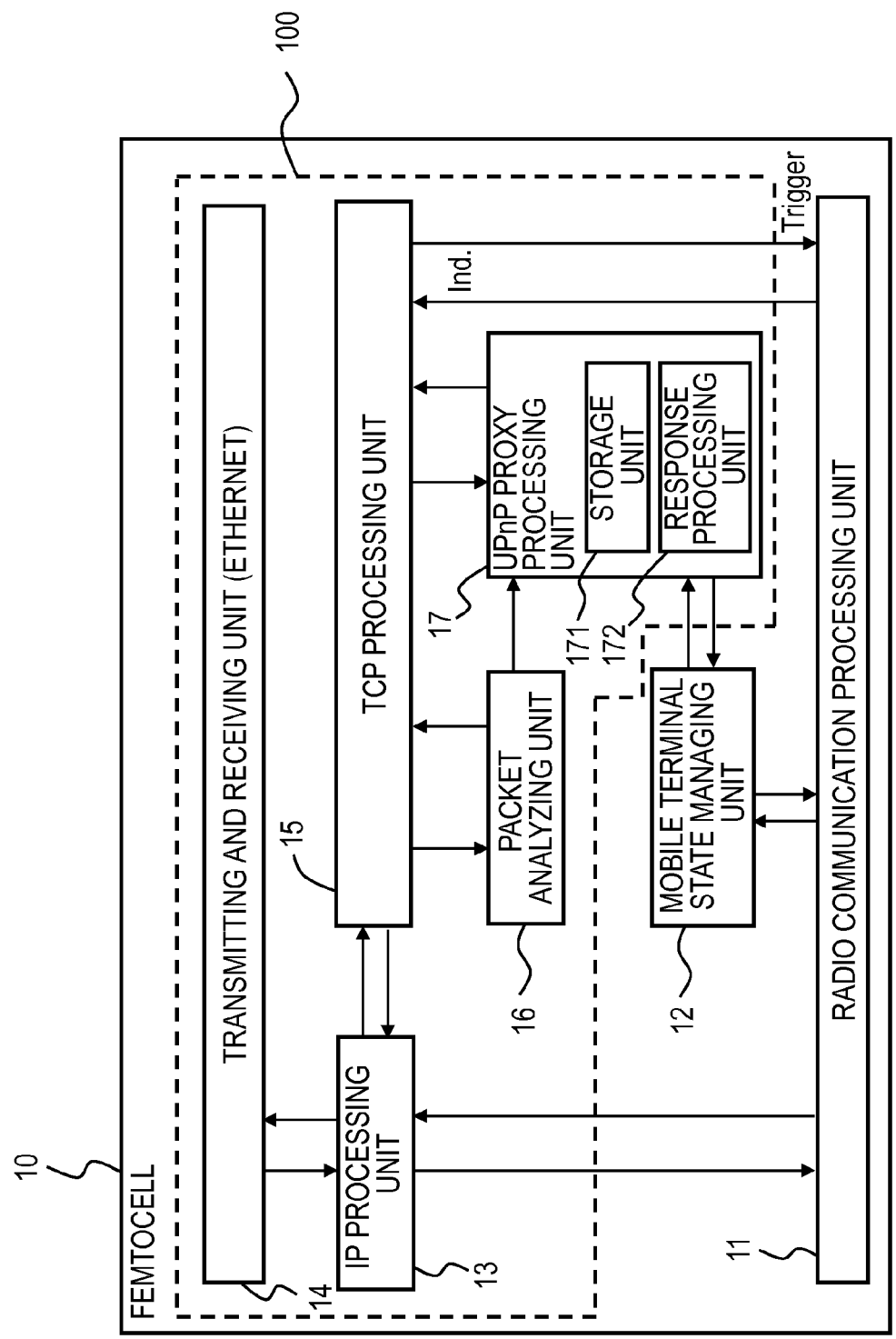
FIG. 15 illustrates a configuration example of a femto cell including the proxy response apparatus.

FIG. 15 illustrates a configuration example of a femto cell 10 including a proxy response apparatus 100. The proxy response apparatus 100 includes the IP processing unit 13, the transmitting and receiving unit 14, the TCP processing unit 15, the packet analyzing unit 16 and the UPnP proxy processing unit 17. Examples 1 and 2 are cases when the proxy response apparatus 100 is included in the femto cell 10.

The present invention can provide a proxy response apparatus which effectively uses the radio resource, a proxy response method for the proxy response apparatus, and a communication system. A proxy response apparatus which reduces power consumption of a mobile terminal can be provided.

The invention claimed is:

1. A proxy response apparatus, comprising:
a storage unit which establishes connection with a mobile terminal by TCP and stores message information included in a packet obtained from the mobile terminal;
a response processing unit which receives a packet from an external apparatus, and responds whether message information included in the receive packet is effective or not to the message information stored in the storage unit, wherein the message information stored in the storage unit is message information obtained from the mobile terminal by processing based on "Presentation" or "Description" in UPnP protocol; and
a TCP processing unit which transmits a packet including a response message to the external apparatus without establishing radio connection with the mobile terminal, when the TCP processing unit inputs the response indicating effective from the response processing unit.

2. The proxy response apparatus according to claim 1, wherein
the response processing unit outputs the response indicating effective if the message information included in the receive packet is stored in the storage unit, and the message information stored in the storage unit is within an effective period.

3. The proxy response apparatus according to claim 1, wherein
the TCP processing unit establishes the connection with the external apparatus by the TCP, receives the receive packet from the external apparatus, and outputs the receive packet to the response processing unit.

4. The proxy response apparatus according to claim 1, wherein
the TCP processing unit establishes the connection with the external apparatus by the TCP, receives the receive packet including the message information, and outputs the receive packet to the response processing unit, when the TCP processing unit receives from the external apparatus a packet including information indicating that the receive packet including the message information is transmitted.

5. The proxy response apparatus according to claim 1, wherein
the TCP processing unit establishes the connection with the mobile terminal by the TCP, and obtains the message information from the mobile terminal, when the TCP processing unit inputs the response indicating not-effective from the response processing unit.

6. The proxy response apparatus according to claim 1, further comprising a radio communication processing unit which performs radio communication with the mobile terminal, wherein
the radio communication processing unit receives the packet including the message information from the mobile terminal according to an instruction from the TCP processing unit, and
the message information included in the receive packet received by the radio communication processing unit is stored in the storage unit.

7. The proxy response apparatus according to claim 1, wherein
the TCP processing unit transmits the packet including the response message to the external apparatus, when the TCP processing unit inputs the response indicating effective from the response processing unit, even if the mobile terminal is not located in a communicable range.

8. A proxy response method in a proxy response apparatus, the method comprising:
establishing connection with a mobile terminal by TCP, and storing to a storage unit of the proxy response apparatus message information included in a packet obtained from the mobile terminal;
receiving a packet from an external apparatus, and responding whether a message information included in the receive packet is effective or not to the message information stored in the storage unit, wherein the message information stored in the storage unit is message information obtained from the mobile terminal by processing based on "Presentation" or "Description" in UPnP protocol; and
transmitting a packet including a response message to the external apparatus without establishing radio communication with the mobile terminal, when inputting the response indicating effective.

9. A communication system, comprising:
an external apparatus;
a proxy response apparatus; and
a mobile terminal, wherein the external apparatus establishes connection with the proxy response apparatus by TCP and transmits a packet to the proxy response apparatus, the mobile terminal establishes connection with the proxy response apparatus by the TCP and transmits a packet to the proxy response apparatus, and the proxy response apparatus includes:
a storage unit which establishes connection with the mobile terminal by the TCP and stores message information included in the packet obtained from the mobile terminal;
a response processing unit which receives the packet from the external apparatus, and responds whether message information included in the receive packet is effective or not to the message information stored in the storage unit, wherein the message information stored in the storage unit is message information obtained from the mobile terminal by processing based on "Presentation" or "Description" in UPnP protocol; and
a TCP processing unit which transmits a packet including a response message to the external apparatus without establishing radio connection with the mobile terminal, when the TCP processing unit inputs the response indicating effective from the response unit.

* * * * *